United States Patent

[11] 3,623,748

| [72] | Inventor | Dewey O. Haynes<br>16 Cushman Road, Brighton, Mass. 02135 |
|---|---|---|
| [21] | Appl. No. | 858,415 |
| [22] | Filed | Sept. 16, 1969 |
| [45] | Patented | Nov. 30, 1971 |

[54] OCCUPANT ACTUATED MEANS FOR PROPELLING A WHEELCHAIR
10 Claims, 6 Drawing Figs.

[52] U.S. Cl..................................................... 280/242,
297/DIG. 4
[51] Int. Cl..................................................... B62m 1/14
[50] Field of Search........................................ 280/210,
211, 242, 242 WC, 36, 39; 297/DIG. 4

[56] References Cited
UNITED STATES PATENTS

| 3,127,188 | 3/1964 | Greub........................ | 280/210 |
| 3,189,368 | 6/1965 | Petersen..................... | 280/242 |

Primary Examiner—Leo Friaglia
Assistant Examiner—Robert R. Song
Attorney—Abbott Spear

ABSTRACT: A wheelchair is disclosed that has a dual rim unit attached to each of its main wheels, each unit slidably supporting a device provided with a friction member engageable with the unit and a handgrip for effecting such engagement, the device being attached to the chair to limit its sliding movement relative to the unit.

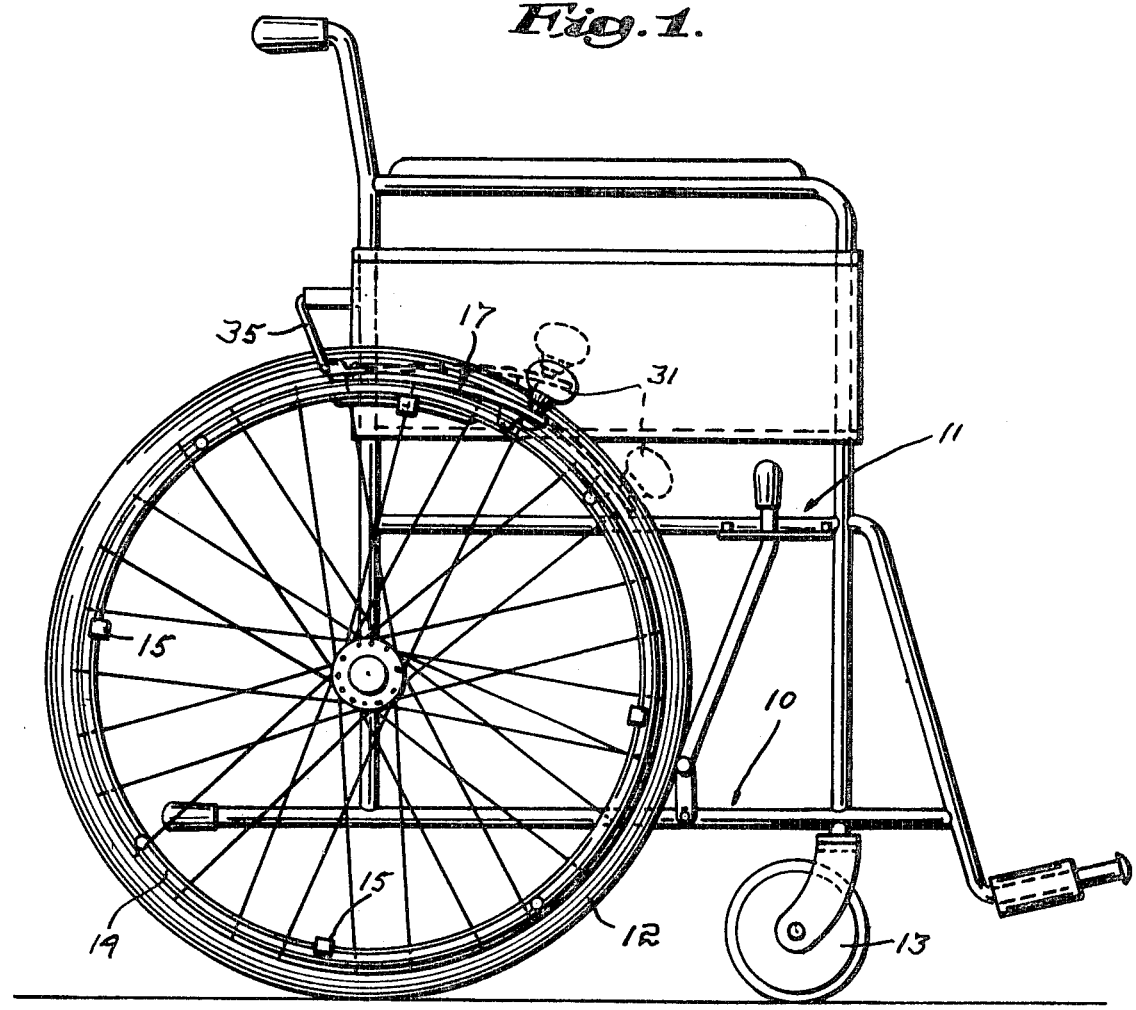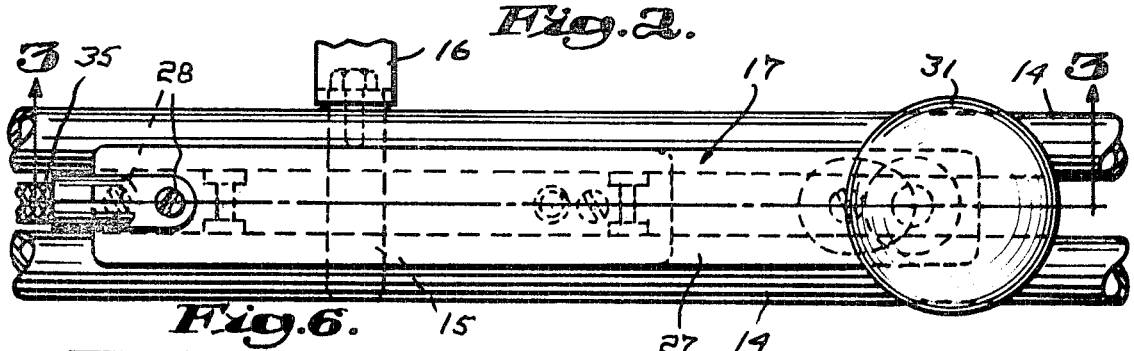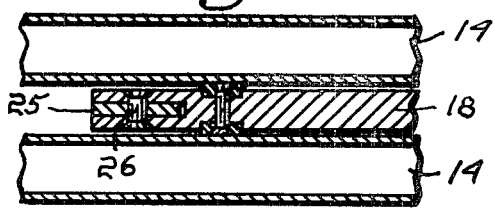

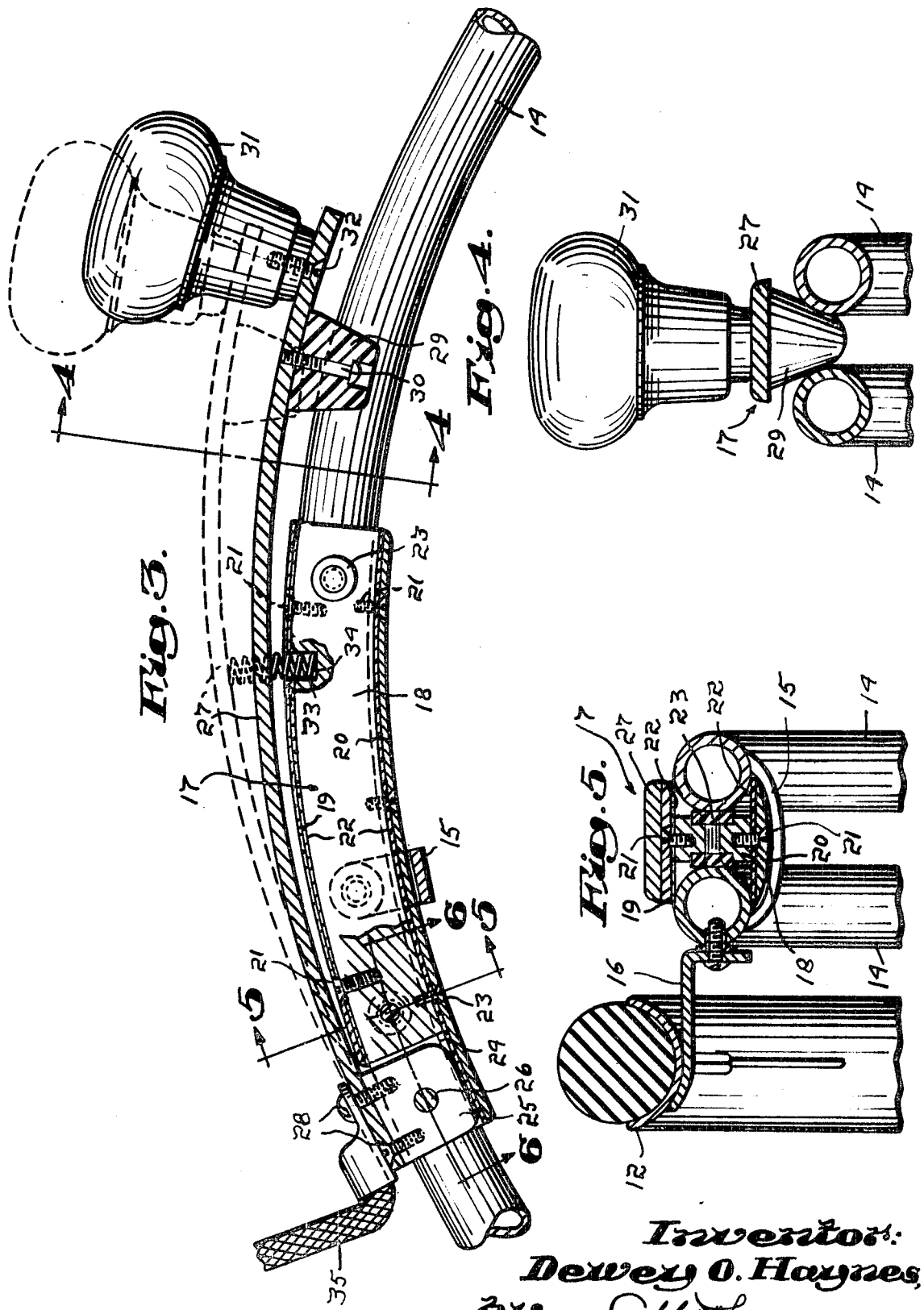

OCCUPANT ACTUATED MEANS FOR PROPELLING A WHEELCHAIR

The present invention relates to wheelchairs and to occupant-actuated means for propelling them.

Wheelchairs have a pair of relatively large main wheels and a pair of casters. The main wheels can be manually gripped by the occupant and turned, either forwardly or rearwardly, thus to propel it. Preferred construction provides a hand rim for each main wheel and of a somewhat smaller diameter and concentrically connected to the main wheel.

It has long been recognized that this method of propelling a wheelchair was not ideal and, indeed, could not be used by many because of physical limitations. Various proposals have been made to provide means that could be more easily operated by such persons, such means including a member that could be pushed forwardly, thus to engage the wheel and cause it to turn. Such apparatus is shown in the U.S. Pat. to Peterson, No. 3,189,368.

While the problem is recognized in that patent, the means proposed for its solution were not satisfactory in that manufacturing and installation problems were presented and the turning force had to be applied directly to the tires of the main wheel.

The general objective of the present invention is to provide an easily installed and easily operated unit for those whose handicaps make it impossible to grip a hand rim but are capable of engaging and pushing forwardly and downwardly on a driving element. In accordance with the invention, the objective is attained by providing each main wheel with a driving unit consisting of a pair of coaxial rims interconnected in spaced relationship and in slidable support of a manually operated device having a friction element for engagement with the rims with the device connected to the chair to limit the extent to which it may travel with or slide relative to the rims but with the rims being able to turn 360° relative to the device.

One objective of the invention is to provide the device with a pivoted arm in support of the friction element with the friction element engaging both rims, preferably as a wedge between them.

Another objective of the invention is to provide a device that includes a bar dimensioned to fit between the rims and outer and inner retainers, each engageable with both rims, the arm being connected to the bar.

In the accompanying drawings, there is shown an embodiment of the invention illustrative of these and other of its objectives, novel features, and advantages.

In the drawings:

FIG. 1 is a side view of a wheelchair in accordance with the invention;

FIG. 2 is a top plan, fragmentary view of one of the wheel-turning units, on an increase in scale;

FIG. 3 is a section taken approximately along the indicated lines 3—3 of FIG. 2;

FIG. 4 is a section taken approximately along the indicated lines 4—4 of FIG. 3;

FIG. 5 is a section taken approximately along the indicated lines 5—5 of FIG. 3 and showing the wheel to which the unit is attached; and FIG. 6 is a section taken approximately along the indicated lines 6—6 of FIG. 3.

The wheelchair shown in the drawings has a frame, generally indicated at 10, in support of a seat 11 and provided with a pair of main or rear wheels 12 and a pair of casters 13.

In accordance with the invention, each wheel 12 is provided with a propelling unit consisting of a pair of rims 14 shown as of circular cross section and interconnected in a spaced coaxial relation by a series of spacers 15. The inner rim 14 is shown as attached to a wheel 12 by a series of mounts 16 such as are used for the attachment of the conventional hand rim.

A slide, generally indicated at 17, includes a bar 18 dimensioned to fit freely between the rims 14 and provided with an outer retainer 19 and an inner retainer 20, the retainers being attached to the bar 18 by screws 21 and dimensioned to engage the rims 14, the bar 18 and its retainers being arcuate in order to conform to the curvature of the rims 14. It will be noted from FIG. 5 that the spacers 15 are so attached to the rims 14 and so shaped as not to interfere with sliding movement of the slide 17.

Strips 22 of an antifriction material are clamped between the retainers 19 and 20, and the bar 18 and antifriction bushings 23 extend transversely through the bar 18 for sliding engagement with the rims 14. Nylon is satisfactory for both the strip 22 and the bushings 23.

The rear end of the bar 18 has, see FIGS. 3 and 6, a vertical slot 24 in which a block 25 is secured by a pivot 26. An arcuate arm 27 is connected to the block 25 by screws 28 and extends forwardly over the bar 18 and beyond its forward end and is there provided with a friction element 29, preferably of rubber, and secured to the arm 27 as by a screw 30. The element 29 is shown as conical and dimensioned for gripping engagement with the proximate portions of both rims 14 when the arm 27 is pushed downwardly. The arm 27 is provided with a grip 31, shown as a knob and secured thereto by a screw 32 but which may be of whatever type meets the requirements of the wheelchair occupant. The arm 27 is yieldably urged away from the rims 14 by a spring 33 fixed in a socket 34 and in the bar 18.

The slide 17 is connected to the chair frame 10 by an elastic cord 35 yieldably holding it in a position with the hand grip 31 forward of the vertical through the axis of the wheels 12 and conveniently accessible to the wheelchair occupant so that he may engage it and push it forwardly. The natural downward pressure resulting, when the slide is pushed forwardly, brings the element 29 into driving engagement with the rims 14. At the end of a stroke, the element 29 becomes disengaged by the spring 32 when downward pressure is released with the slide 17 and will return by itself under the influence of the elastic cord 35.

I claim:

1. In a wheelchair, a pair of transversely aligned wheels, one on each side of the chair, and an annular, concentric wheel turning unit for each wheel and connected thereto, each unit of a diameter less than that of said wheel, and a manually operable device, means for slidably mounting said device on said unit to enable said unit to turn through a complete revolution relative thereto, said device including a friction element movable into and out of driving engagement with said unit, and means connecting said device to said chair to limit the extent to which said device may travel with or slide relative to the unit from a predetermined position accessible to the chair occupant.

2. The wheelchair of claim 1 in which the means connecting the device to the chair is elastic.

3. The wheelchair of claim 1 and resilient means yieldably holding the driving element out of driving engagement with the rims.

4. The wheelchair of claim 1 in which each unit includes a pair of rims interconnected in spaced parallel relationship, and the device includes a bar dimensioned to fit between the rims and include inner and outer retainers engageable therewith, an arm pivotally connected at one end to the bar extends beyond the bar, and the driving element is connected to the free end of the arm.

5. The wheelchair of claim 4 in which the driving element is engageable with both rims.

6. The wheelchair of claim 5 in which the driving element is wedge shaped in cross section.

7. The wheelchair of claim 4 and antifriction means carried by the bar and retainers and engageable with the rims.

8. The wheelchair of claim 4 and a spring carried by the bar engages the arm and yieldably holds the driving element out of driving engagement with the rims.

9. The wheelchair of claim 4 in which the bar and retainers are arcuate to conform to the curvature of the rims.

10. The wheelchair of claim 4 in which the arm is arcuate thus to closely overlie the rim.